Nov. 2, 1965   H. M. BROWN ETAL   3,215,978
VEHICLE TIRE PRESSURE ALARM SYSTEM
Filed Dec. 28, 1961   3 Sheets-Sheet 1
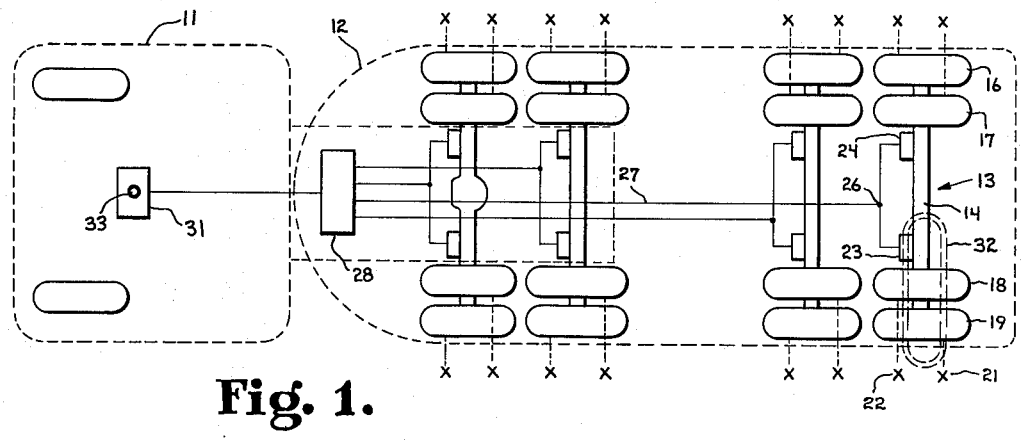
Fig. 1.
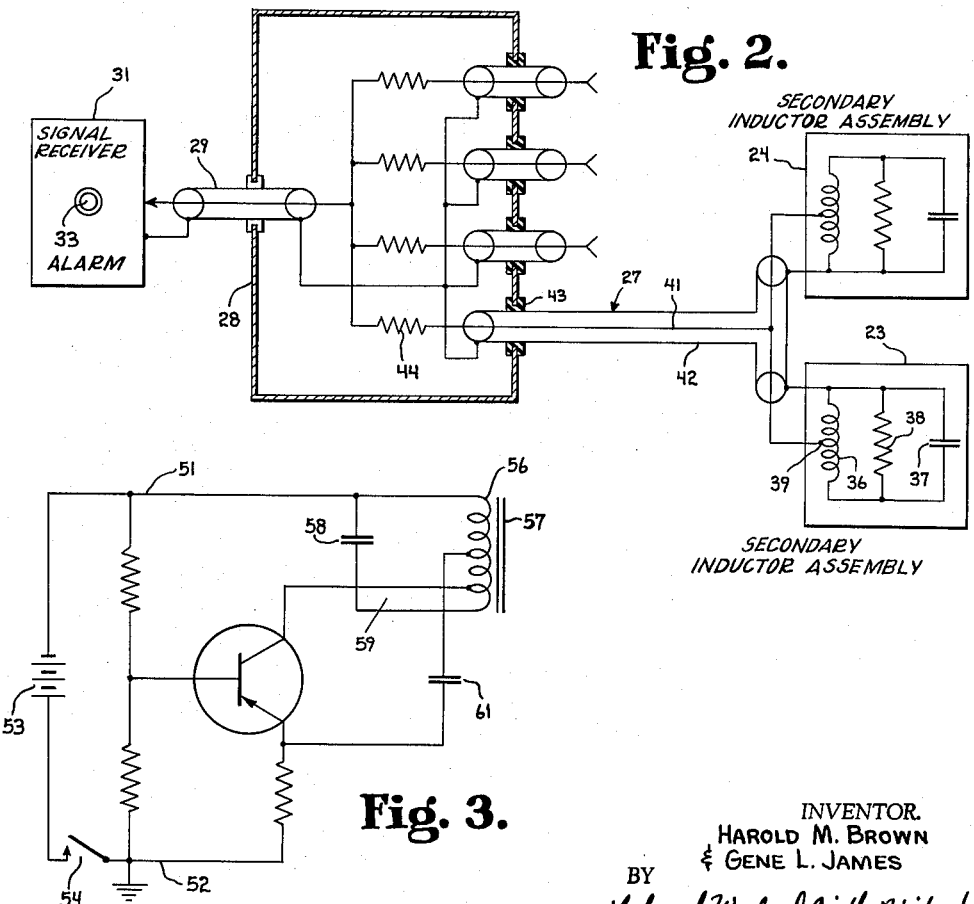
Fig. 2.
Fig. 3.
INVENTOR.
HAROLD M. BROWN
& GENE L. JAMES
BY
Lockwood, Woodard, Smith & Weikart
Attorneys

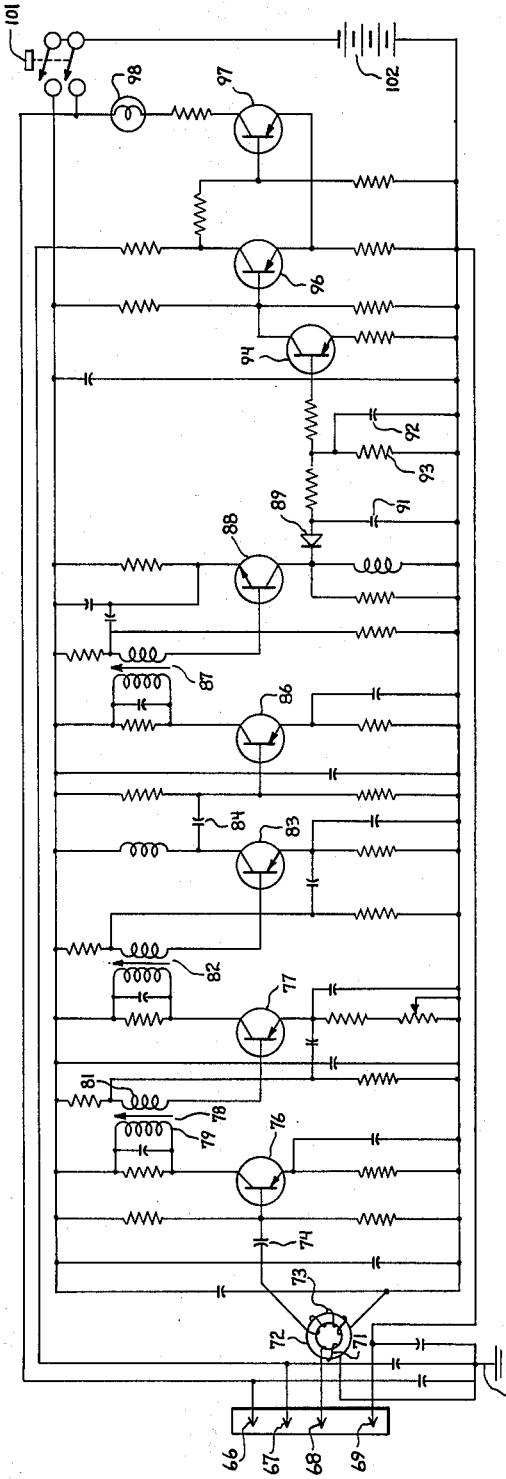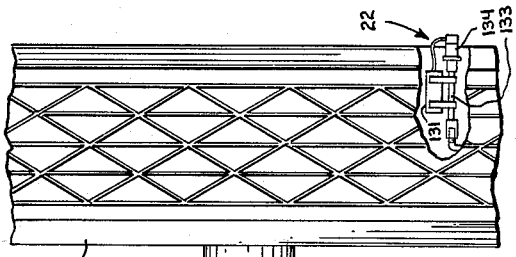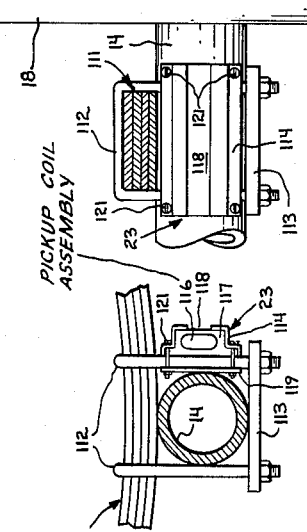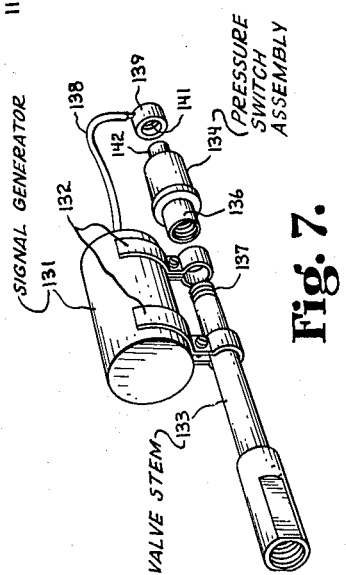
Fig. 4.
Fig. 6.
Fig. 5.
Fig. 7.
INVENTOR.
HAROLD M. BROWN
& GENE L. JAMES Nov. 2, 1965       H. M. BROWN ETAL       3,215,978
VEHICLE TIRE PRESSURE ALARM SYSTEM
Filed Dec. 28, 1961                    3 Sheets-Sheet 3

INVENTORS.
HAROLD M. BROWN
BY  & GENE L. JAMES
*Lockwood, Woodard, Smith & Weikart*
Attorneys 3,215,978
VEHICLE TIRE PRESSURE ALARM SYSTEM
Harold M. Brown, Fort Wayne, Ind., and Gene L. James, Champaign, Ill., assignors to The Magnavox Company, Fort Worth, Tex., a corporation of Delaware
Filed Dec. 28, 1961, Ser. No. 162,857
11 Claims. (Cl. 340—58)

This invention relates generally to alarm systems, and more particularly to a system whereby the pressure in the tires of a motor vehicle is continuously monitored and abnormal pressure conditions detected and indicated to the driver of the vehicle.

In all motor vehicles borne by pneumatic tires, it is important to maintain correct pressure in the tires for a number of reasons. Improperly inflated tires wear incorrectly and excessively. Moreover, they make a vehicle difficult to steer and to control regardless of whether they are front tires or rear tires. Underinflated tires increase rolling resistance and, therefore, increase the power required to move a vehicle. Moreover, due to the excessive flexing of the sidewalls as an underinflated tire rotates, considerable heat will be generated in the tire with attendant breakdown of the sidewall and possible complete destruction of the tire. Occasionally excessive heat generation due to underinflation causes tires to catch fire during operation.

While a truck may depart from a terminal with its tires properly inflated, it is quite possible that in the course of operation, one or several of the many tires on a semi-trailer or trailer type of truck may lose pressure. Frequently where a vehicle is multi-wheeled as are semi-trailer and trailer truck combinations, the condition of under-inflation does not immediately manifest itself by difficulty of control of the vehicle. Therefore, destruction of a tire can occur before the operator becomes aware of the condition.

It is, therefore, a principal object of this invention to provide an alarm system responsive to abnormal pressure in a pneumatic tire to indicate to the operator of the vehicle that the condition exists.

It is a further object of this invention to provide an improved alarm system whereby no physical connection is required between the rotating wheel of the vehicle and the non-rotating portion or portions thereof.

It is a still further object of this invention to provide an alarm system capable of the foregoing objects and which does not require licensing by the Federal Communications Commission for operation, and which in no way interferes with radio reception in the vicinity of the vehicle equipped with the system.

It is a still further object of this invention to provide means for achieving the foregoing objects and characterized by maximum simplicity and facility of installation and operation.

It is a still further object of this invention to provide means for achieving the foregoing objects and further characterized by provision for easily reinflating the tires with the system installed, and characterized by reliability in operation.

In a typical embodiment of the present invention a unit is mounted to the inflation valve stem for each of the tires of the vehicle to be monitored and includes a battery and an electromagnetic propagation signal generator. Also mounted directly to the valve stem is a pressure switch responsive to pressures below a certain predetermined minimum satisfactory level in the tire to energize the signal generator whenever pressure falls below the predetermined level.

The signal generator includes a primary inductor to establish an electromagnetic field in the vicinity of the tire containing the low pressure. All of the signal generators used in one installation of a system on a truck are tuned to operate at essentially the same frequency.

A secondary inductor is mounted to the axle close to the tires thereon. The secondary inductors for the left side and right side of an axle are wound in phase opposition whereby effects of externally generated noise are minimized. The secondary inductors are coupled to a signal receiver including a tuned amplifier and detector.

When any one of the signal generators is energized, the signal will be picked up by the adjacent secondary inductor and coupled through the amplifier and detector to an alarm which may be in the form of a light or a buzzer or other suitable annunciator. The signal receiver may then be removed from the cab of the vehicle whereupon the signal input from the secondary inductor to the receiver is disconnected. By virtue of the provision of a low-sensitivity pickup coil in the receiver unit, it will respond to the energized signal generator when held in close proximity thereto. In this manner the individual tire which has a low pressure therein may be detected. An alternative method of detecting the individual tire, is provided by a novel feature of the pressure switch whereby the low pressure condition may be detected upon pushing the switch.

The full nature of the invention will be understood from the accompanying drawings and the following description and the claims.

FIG. 1 is an illustrative diagram of an application of the present invention to a tractor semi-trailer combination.

FIG. 2 is a schematic diagram of the coupling of the secondary inductors to the signal receiver.

FIG. 3 is a schematic diagram of a signal generator which may be used in the practice of this invention.

FIG. 4 is a schematic diagram of a signal receiver typically used.

FIG. 5 is a fragmentary illustration, partially in section, showing a preferred mounting of the secondary inductor assembly to an axle.

FIG. 6 is a fragmentary illustration of the mounting in FIG. 5 shown from the front or viewed from the front of the axle.

FIG. 7 is a fragmentary exploded illustration of the mounting of the signal generator and control switch to the valve stem.

Figure 8:
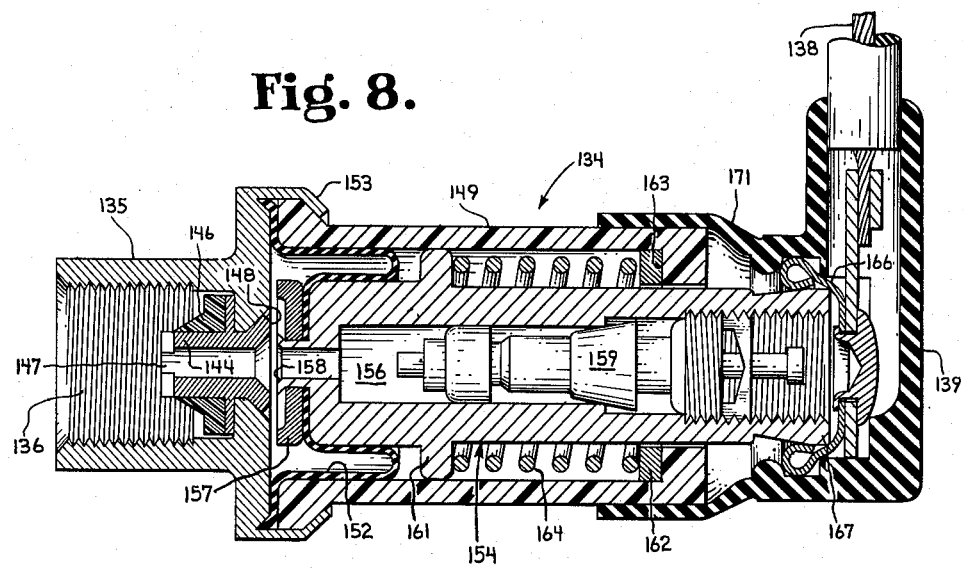
FIG. 8 is a section through the novel pressure switch of this invention.

Referring to FIG. 1, the dotted outlines represent a tractor 11 and a semi-trailer 12. The semi-trailer has two sets of dual wheels, the sets being arranged in tandem and the tractor also has a pair of sets of dual wheels arranged in tandem and supporting the forward portion of the trailer. One set of dual wheels, for example the rear set 13 on the semi-trailer, will be considered. This set includes an axle 14 carried by four wheels including the tires 16, 17, 18 and 19. The tires 16 and 17 are arranged so that the valve stems with the signal generators mounted thereon, as indicated schematically by the "X," are disposed 180° with respect to each other. For example, tire 19 has a signal generator 21 mounted to the valve stem thereof and tire 18 has a signal generator 22 mounted to the valve stem thereof.

A first secondary inductor assembly 23 is mounted to the axle 14 adjacent the tires 18 and 19. A second secondary pickup assembly 24 is mounted to the axle 14 adjacent the pair of tires 16 and 17. The outputs of these pickup assemblies are joined at 26 and coupled by a coaxial cable 27 to the interconnection box 28 which may be mounted on the tractor 11. A coaxial cable 29 from the interconnection box 28 is connected to the signal receiver 31. Thus the signal output of any one of the secondary inductors mounted in either of the two locations on any axle is made available at the signal receiver 31.

When any one of the signal generators is energized, it establishes an electromagnetic field which intercepts or is intercepted by the secondary inductor pickup loop mounted adjacent the tire on the axles supported by the tire. For example, if tire 19 is below the minimum acceptable pressure, the signal generator 21 thereon is energized. It establishes an electromagnetic field represented by the dashed line 32 which induces energy in the secondary inductor 23. Thus, inductor 23 provides a signal to the receiver 31 to operate the alarm device 33.

Referring to FIG. 2, additional detail of the couplings of the secondary inductors to the signal receiver are illustrated. Inductor assembly 23 includes a tuned circuit comprising the coil 36 and the capacitor 37 in parallel with the resistor 38 connected thereacross. Coil 36 is tapped at point 39 to provide an output of suitable impedance through the coaxial cable 27 which includes the center conductor 41 and the outer conductor 42 which is usually woven. While coaxial cable is mentioned throughout as being one means of obtaining the electrical connections, it should not be inferred that such cable is necessary, as other two wire conductors may serve equally well.

Cable 27 is shown entering the interconnection box 28. At the entry a grommet 43 is shown to illustrate that the outer conductor of the cable is not necessarily grounded to the box 28. If the outer conductor 42 is grounded to the box 28, best results are obtained by insulating the box from the chassis of the truck tractor in order to secure a minimal pickup of noise. The center conductor 41 is connected through a resistance 44 to the center conductor of cable 29. This cable is then connected to the signal receiver 31, and usually the outer conductor of cable 29 is grounded to the chassis of the signal receiver 31. The outer conductor of cable 29 is, of course, connected to the outer conductor 42 of the cable 27 and to the outer conductors of the cables entering the box from the other inductors shown in FIG. 1. Perhaps it should again be mentioned at this point, that best results are maintained if the coils in the two inductor assemblies mounted to a given axle are arranged in phase opposition. For example, if the coils of the inductor assembly 23 and inductor assembly 24 are wound for phase opposition, a significant noise bucking advantage is obtained.

Referring to FIG. 3, the signal generator, pressure switch contacts, and battery are shown schematically. The signal generator includes a Hartley oscillator with the energy inputs thereto applied across the lines 51 and 52 by the battery 53 coupled thereto through the normally open pressure switch contacts 54. The coil 56 is normally provided with a core 57, though the core can be dispensed with, if desired. The core is used principally for convenience and to minimize the size of the unit. The coil provides the primary inductor from which the secondary inductors of FIGS. 1 and 2 are able to pick up the signals generated when the switch 54 is closed.

The coil 56 and capacitor 58 are of values whereby the tank circuit 59 is tuned to 100 kilocycles, for example. Components are selected to provide a maximum drift of approximately 1 kilocycle over the ambient temperature range in which the signal generator may be operated which is of the order of from 60° below zero F. to 160° above zero F. The feedback capacitor is of a value which, along with the values in the tank circuit, provide the desired frequency.

Referring to FIG. 4, the signal receiver assembly 31 is shown schematically. This will be recognized to be basically a type of tuned radio frequency amplifier followed by a detector and having a long time constant at the output stage. Four inputs 66, 67, 68 and 69 to the receiver are shown. Input 68 is the signal input and it is to this input that the center conductor of the cable 29 of FIG. 2 is connected. The remaining three inputs are for a power supply to the receiver and by way of example, a 6 volt negative potential is applied to the inputs 66 and 67, and a 6 volt positive potential is applied to the input 69. Numeral 70 designates ground.

The signal input 68 is coupled to the primary winding 71 of the input transformer 72. The output winding 73 thereof is coupled through capacitor 74 to the control electrode of the first tuned amplifier stage. This stage includes the transistor 76 having a collector magnetically coupled to the base of transistor 77 of the second tuned amplifier stage. The magnetic interstage coupling is provided by means of the transformer 78 having a tuned primary 79 and untuned secondary 81. Similar interstage coupling is provided between the second tuned amplifier stage including transistor 77 and the third amplifier stage. The collector of transistor 77 is coupled through the transformer 82 to the base electrode of transistor 83. This transistor 83 is an L–C amplifier stage capacitively coupled through capacitor 84 to the base electrode of transistor 86 of the fourth amplifier stage which is also a tuned amplifier stage. The collector of transistor 86 is coupled through tranformer 87 to the base electrode transistor 88 of the second L–C amplifier stage.

The output of the amplifier is detected by the diode 89 and capacitor 91, diode 89 being connected to the collector of transistor 88. The detected output of the amplifier is coupled with a suitable time delay provided by capacitor 92 and resistor 93 principally, to the base electrode of the D.C. amplifier stage transistor 94.

The receiver output includes a pair of transistors 96 and 97. Transistor 96 is normally on, and upon rise of the collector potential of transistor 94 to a suitable value, will be turned off. The normally off transistor 97 will be turned on at this time, the intercoupling of transistors 96 and 97 being regenerative to provide fast response. Turning on of transistor 97 closes the circuit through the lamp 98 whereupon a signal is provided for the operator of the vehicle to indicate that the pressure of one of his tires is low. In this example, lamp 98 may be the warning device 33 of FIG. 1.

It has previously been mentioned, that when the operator of the vehicle is alerted that one of his tires contains an abnormal pressure, the signal receiver can be removed from the cab of the vehicle and be carried around in the hand of the operator to the various tires to indicate which one has the low pressure. Upon removal of the receiver from the vehicle, it will be recognized that the connector providing the four inputs to the receiver must be disconnected. In this event, there is no electrical energy provided nor is there a signal provided through the input 68 to the receiver. However, by pressing the switch button 101, the battery 102 is placed in circuit with the receiver circuitry, whereupon the necessary electrical energy is provided. Also, the input transformer 72 is useful, if moved close enough to a signal generator, to pick up the field induced by the coil of the signal generator and provide an output to the lamp 98. However, by virtue of the relatively inefficient nature of the input transformer 72 for picking up a signal from an external field, the receiver must be held rather close to the generator in order to pick up the signal. This has the advantage of making it possible to determine the specific signal generator which is operating and thereby pick out the tire with the low pressure. In order to give an example of the relative sensitivity of the input transformer 72 as an inductor as compared to the secondary pickups mounted on the axles, a useful signal will be provided by the axle pickup though it may be a few yards from the energized signal generator, whereas a useful signal will be produced by the input transformer only when it is within a few inches of the energized signal generator.

It will be recognized that if both tires of a single dual wheel set are oriented so that the valve stems are immediately adjacent one another, it will be difficult if not impossible to distinguish which of the tires has the low pressure by use of the foregoing locating method. Therefore, for best results, the valve stems on a single pair of tires should be separated somewhat and, of course, 180° separation is the optimum condition. Nevertheless, even if the tires are oriented so that both valve stems are right together, detection of the tire with low pressure can be made by the "push-to-test" feature of the pressure switch which will be discussed hereinafter.

Referring to FIG. 5, which is a fragmentary side view of a typical mounting of the secondary pickup assembly to the axle of a truck, the axle 14 is shown supporting a group 111 of leaf springs which are secured to the axle by means of U-bolts 112 and strap 113. The pickup assembly 23 includes the housing 114 which is made of a suitable material to provide electrostatic shielding. The pickup coil assembly 116 is disposed in potting compound 117 and oriented parallel to the axle. A suitable slot 118 is provided in the front of the inductor housing to avoid a shorted turn. A plate 119 is provided between the front U-bolt and the front of the axle housing 14 and the inductor housing 114 is secured thereto by means of the screws 121.

In FIG. 7, which is an exploded illustration of the signal generator and switch combination with the valve stem, the signal generator assembly including the oscilator portion and battery are housed in the package 131 which is secured by the straps 132 to the valve stem or stem extension 133. The pressure switch assembly 134 has internal threads at the one end 136 thereof by which it may be secured to the threads 137 at the end of the valve stem 133. A suitable lead 138 from the package 131 and having a cap 139 at the end thereof with a connector clip 141 therein can be secured to the connector end 142 of the switch assembly. This detail will become more readily apparent in the description of FIG. 8 which follows.

Referring to FIG. 8, the pressure switch assembly 134 includes a base 135 having the internal threads 136 by which it may be mounted to the valve stem 133 of FIG. 7. Attached to the base is a core seal assembly which includes the key 144 and the seal 146 mounted thereon, and which may be made of nylon or other suitable material. The key performs several functions. By virtue of its small size at the forward end 147 thereof, it depresses the core pin of the valve core in the valve stem 133 when the switch assembly is mounted to the valve stem 133. Therefore, communication between the inside of the tire and the presure switch is accomplished.

The rear end 148 of the key which is flared to secure to the base 135, serves as a contact member to provide an electrical contact when the pressure drops below the predetermined value established as a minimum acceptable.

The switch assembly includes a housing tube 149 which is usually made of an electrically non-conducting material. It is flared at its lower end and is secured to the base 135 which is electrically conducting material, along with the diaphragm 152 by spinning the flange 153 on the base.

Within the housing 149 is the valve assembly 154 which includes the valve 156 which is sealed to the diaphragm 152 by means of the electrically conductive diaphragm retainer 157 which is in turn secured to the valve by the flare 158 at the lower end of the valve. Threadedly secured within the valve 156 is a standard valve core assembly 159.

The valve includes a flange 161. A washer 162 is disposed within the housing 149 and against the shoulder 163 therein. A compression spring 164 is compressibly disposed between the washer 162 and the flange 161 and normally places the flared end 158 of the valve against the key 144, or the diaphragm retainer 157 against base 135, when the pressure in the tire is below a predetermined value. Thus, if the valve and key are of electrically conductive material, they may be said to be in electrical contact at the time.

Electrical connection to the pressure switch assembly is made by means of the connector clip 166 secured to the connector end 167 of the valve 156. A suitable cap or boot 139 is provided to elminate dirt and other contaminates. The boot is usually made of a soft resilient material. There is a thin section 171 on the boot whereby it affords no resistance to longitudinal motion of the valve 156 within the housing 149.

The dimensions and spring may be selected to provide for separation of the retainer 157 on the valve 156 and the base 135 until such time as the pressure in the tire drops below a predetermined minimum suitable value. For example, if the minimum tire pressure acceptable is 70 p.s.i., the dimensions and components are sized and loaded such that the flare 158 and the upper end 148 of the key 144 are separated at any pressure above 70 p.s.i. Normally, they are also sized so that the maximum travel desired of the valve with respect to the housing tube 149 would be obtained at approximately 10% to 15% greater pressure than the minimum acceptable. In this manner, and by virtue of the novel construction of the switch, a person can detect whether or not pressure in a tire is at or above the minimum value by simply pushing on the cap of the pressure switch assembly. If movement is felt prior to the stopping by way of the seating of the valve on the key, the tire is properly inflated. On the other hand, if no movement is detected, it is known that the tire is at or below the minimum acceptable pressure. Therefore, even though the valve stems on a pair of dual tires are immediately adjacent one another, if one of the tires is underinflated, by simply pushing the cap on the pressure switch, the operator can determine which of the two tires is underinflated. This feature also provides the means for determining that the signal generator is operable.

The switch can be made adjustable, if desired, by providing a sleeve between the valve 156 and the housing 149 and threadedly engaged with the housing. At the inner end of the sleeve it would abut the washer 162 and at the other end a knurled annular surface could be provided. Turning of the sleeve would shorten or lengthen the spring. Suitable micrometer-type pressure dial markings could be provided on the housing and sleeve. The sealing boot 139 would normally enclose the additional parts.

Figure 9:
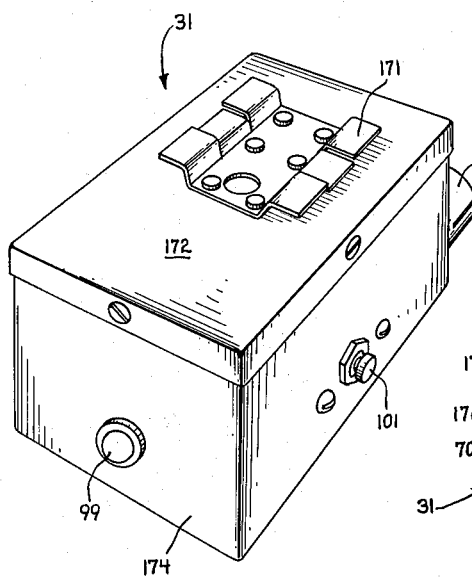
FIG. 9 is a perspective of the signal receiver assembly used according to this invention showing the top, front, and righthand sides thereof.
Figure 10:
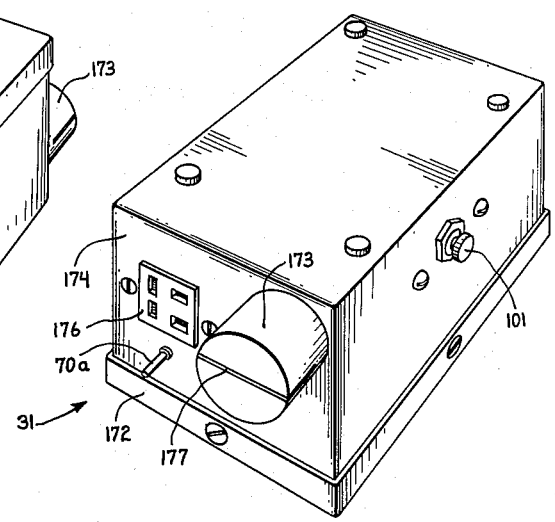
FIG. 10 is a perspective of the signal receiver used according to this invention showing the bottom, rear and righthand sides thereof.

Referring to FIG. 9, the signal receiver assembly 31 is shown with a mounting clip 171 on the top cover plate 172 thereof whereby it may be conveniently suspended from a bracket under the instrument panel of the truck. The warning lamp 98 of FIG. 4 may be mounted behind a colored glass jewel 99 on the front panel of the receiver. The internal battery switch button 101 shown on the side of the case operates the switch shown in FIG. 4. The input transformer housing 173 is shown extending from the rear of the case. This housing is more readily apparent in FIG. 10 which is a perspective of the receiver assembly upside-down with the rear side 174 thereof at the front of the illustration. The input terminal connector block 176 is shown in the rear face which includes the input terminals described in the description of FIG. 4. A grounding plug 70a is also shown. The housing 173 is split at 177 in order to avoid a shorted turn effect on the input transformer when it is used as an inductive pickup to pick out the individual tire having the low pressure therein. The housing may be made of any suitable material such as bronze or aluminum, for example, whereby it provides suitable electrostatic shielding.

While a membrane type diaphragm seal is shown in the pressure switch, other types can also be employed such as a bellows, for example.

Also, while the valve assembly is electrically conductive in the illustrated embodiment, it could be non-conductive with a conductor running through it, for example. Also, if desired, a solid body could be used instead of the valve type of body illustrated, to respond to pressure and perform the switching.

It would be within the scope of the system of the invention to employ a pressure switch not mounted to the valve stem but coupled thereto by a hose or other conduit.

The advantages of the present invention should be readily apparent. By use of the single frequency, the signal receiver can be quite simple. Moreover, there is no necessity of stocking a variety of signal generators for replacement purposes in the event that one should become damaged by a stone or boulder or by some other cause in the operation of the vehicle. All signal generators being tuned to the single frequency operation are interchangeable.

By mounting the secondary pickup inductors on the axle with the core parallel to the axle, and by mounting the primary inductors of the signal generators on the valve stem and parallel to the axis of the valve stem which is normally parallel to the axle in trucks, the best possible inductive signals can be provided. In this manner, when a signal generator is energized by virtue of the underinflated tire, the field created in the secondary or pickup loop is substantially unchanged as the wheel rotates. This is conducive to a receiver signal of constant value. Thus, the alarm would not operate intermittently as the wheel rotated. Also, before starting a trip, the driver can know the condition of all the wheels, that is whether any tire is underinflated, without moving the vehicle at all. On the other hand, if the arrangement herein disclosed were not used, it might be necessary for the operator of the vehicle to move the vehicle forward and backward so that the signal generator field would most closely be coupled to the pickup loop at some point so as to indicate the condition of low tire pressure. This parallel arrangement is mentioned as producing the best results but the invention is certainly not limited to this aspect.

It has been found in the practice of the present invention that it is sometimes desirable in case of the front wheels of the vehicle, to mount the pickup coils on the fenders in order to avoid excessive noise which may be otherwise generated by the engine in the system if the secondary inductors are mounted on the axles of the front wheels. Such a modification should be considered well within the scope of the present invention.

In the signal receiver, effects of atmospheric and other interference generators are minimized by using magnetic interstage coupling, peak clipping at the detector, and a long time constant at the output stage. The receiver is thus made a narrow band unit having an effective band width of approximately 3 kilocycles which, in itself, considerably limits noise and interference. By virtue of the long delay in the detector and subsequent circuits (about three seconds), a single noise spike will not turn the alarm on. This prevents spurious signals of short duration from giving erroneous indications.

Other uses of this basic system which have been considered are the sensing of overheated brakes and bearings using heat sensing switches instead of pressure sensing switches.

While the invention has been disclosed and described in some detail in the drawings and foregoing description, they are to be considered as illustrative and not restrictive in character, as other modifications may readily suggest themselves to persons skilled in this art and within the broad scope of the invention, reference being had to the appended claims.

The invention claimed is:

1. An electrical switch responsive to an abnormal pressure and comprising:
   a housing having a portion securable to a pressure tap;
   a body movably mounted in said housing and having an integral portion thereof extending to the exterior of said housing and having a portion in electrical contact with said securable housing portion;
   and a diaphragm sealing said housing to said body whereby pressure communication from a pressure tap to said housing is operable on said body to move said body in said housing to break electrical contact between said body and said housing and increase the amount of extension of said integral portion to the exterior of said housing.

2. An electrical switch responsive to an abnormal pressure condition in a pressure container and comprising:
   a housing including electrically conductive means for securing said housing to a pressure tap;
   an electrical conductor electrically connected to said securing means;
   an electrically conductive body movably mounted in said housing and having a portion extending to the exterior of said housing; spring biasing means in said housing and biasing said body into engagement with said conductor and thereby establishing an electrical path between said securing means and said body;
   and a diaphragm providing a seal between said housing and said body and attached to said housing and said body whereby said body an said conductor are separable by pressure above a predetermined value operating on said diaphragm to move said body against the spring bias and thereby to break said path.

3. An electrical switch responsive to an abnormal pressure condition and comprising:
   a housing including electrically conductive means for securing said housing to a pressure tap;
   an electrical conductor electrically connected to said securing means;
   an electrically conductive valve body movably mounted in said housing and mechanically biased to engage said conductor to establish an electrical path between said securing means and said valve body, said valve body having a portion extending outside said housing with a passageway therethrough to accommodate forcing of gas therethrough into the pressure tap, and said valve body having a valve core in said passageway to provide a seal therefor;
   and a diaphragm providing a seal between said housing and said body and attached to said housing and said body whereby said body and said conductor are separable by pressure at the tap above a predetermined value opposing said bias, to break said path.

4. A switch responsive to an abnormal pressure condition in a pressure container, said switch comprising:
   inlet means,
   said inlet means having threads for securing to a valved pressure tap and having a seal to seal said inlet to said tap and having a key for depressing a valve core in the tap upon installation of said inlet means on the tap;
   a housing on said inlet means; a body movably mounted in said housing and having an integral portion extending outside of said housing;
   resilient means engaging said housing and said body and biasing said body into engagement with said inlet means;
   and a flexible diaphragm attached to said body and to said inlet means and sealing said body to said inlet means whereby container pressure above a predetermined level operating on said diaphragm and opposing the bias of said resilient means can separate said body from said inlet means and increase the degree of extension of said integral portion outside of said housing.

5. In a tire alarm system:
a first package mounted to a tire inflation valve stem of a pneumatic tire, said first package including a source unit of electrical energy and a signal generator unit, one of said units being connected to said valve stem and the other of said units being connected to a conductor lead extending outside of said package;
and a second package mounted to said valve stem,
said second package including a housing having a portion secured to said valve stem,
and including a body movably mounted in said housing having a portion extending from said housing with said conductor lead connected thereto, said body also having a portion in electrical contact with said secured housing portion to make an electrical circuit with said source unit and signal generator unit to energize said signal generator unit,
and said second package including a diaphragm attached to said housing and to said body and sealing said housing to said body whereby pressure communicated from said valve stem to said housing is operable on said body to move said body in said housing to break electrical contact between said body and said housing and thereby deenergize said generator unit.

6. An electrical switch responsive to an abnormal pressure in a container comprising;
a housing having an electrically conductive portion securable to a pressure tap;
a body movably mounted in said housing, said body having a portion extending to the exterior of said housing and having a portion in electrical contact with said securable housing portion;
a diaphragm attached to said housing and to said body and sealing said housing to said body whereby pressure communicated from a pressure tap to said housing is operable on said body to move said body in said housing to break electrical contact between said body and said housing;
an electrical connector secured to said extending portion of the body, said connector having a flexible electrical conductor secured thereto;
and a sealing boot engaging said housing and said connector to enclose said extending portion and said connector, said sealing boot having a flexible portion extending between said housing and said connector to facilitate movement of said connector together with said body, with respect to said housing.

7. In a tire alarm system:
a pneumatic tire having a tire inflation valve stem;
a first package including a source unit of electrical energy and a signal generator unit,
one of said units being connected to said valve stem and the other of said units being connected to a conductor lead extending outside of said package;
and a second package mounted to said valve stem,
said second package including a housing having a portion secured to said valve stem,
and said second package including a body movably mounted in said housing having a portion extending from said housing with said conductor lead connected thereto, said body also having a portion in electrical contact with said secured housing portion to make an electrical circuit with said source unit and signal generator unit to energize said signal generator unit,
and said second package including a diaphragm attached to said body and to said housing and sealing said housing to said body whereby pressure communicated from said valve stem to said housing is operable on said body to move said body in said housing to break electrical contact between said body and said housing and thereby deenergize said generator unit.

8. A tire pressure alarm system for a vehicle having a plurality of pneumatic tires, said system comprising: a plurality of signal generators; a plurality of pressure sensitive electrical switches; each of said generators being electrically coupled to and operable by one of said switches, and each of said switches being connected to one of the tires of said vehicle and operable at a predetermined variation of pressure in the tire to which the switch is connected to operate the generator coupled to the switch, all of said generators being operable to produce signals of substantially one frequency; a signal receiver responsive to said one frequency and including an alarm device operable to indicate at least one tire has a variant of pressure, said signal receiver being portable and movable to a position; magnetically coupling said signal receiver to one of said signal generators to actuate said alarm device when said one generator is generating a signal.

9. In a vehicle having an operator's compartment and pneumatic tires, a tire alarm system comprising:
signal generator means at various pneumatic tires of the vehicle, each generator means producing a varying magnetic field signal in response to a change of condition to a predetermined extent in the tire associated therewith;
a portable receiver in said operator's compartment, said receiver being responsive to the signals produced by said generator means and coupled to an alarm to operate said alarm in response to reception of said signals;
signal pickup means in said vehicle and connected to said receiver when said receiver is in said compartment and coupling signals from said generator means to said receiver to operate said alarm whenever any of said generator means produces a signal, said receiver being insensitive to said signals when disconnected from said pickup means and removed from said compartment until said receiver is held in close proximity to the generator means generating the signals whereupon said receiver responds to said signals and operates said alarm.

10. In a vehicle having an operator's compartment and pneumatic tires, a tire pressure alarm system comprising:
signal generator means at various pneumatic tires of the vehicle, each generator means producing a varying magnetic field signal in response to the drop of pressure in the tire associated therewith to less than a predetermined value, each of said signal generator means being capable of producing a signal of the same frequency as that of each other generator means;
a portable receiver in said operator's compartment, said receiver being responsive to signals of said frequency and coupled to an alarm to operate said alarm in response to reception of said signals;
signal pickup means in said vehicle and connected to said receiver when said receiver is in said compartment and coupling signals from said generator means to said receiver to operate said alarm whenever any of said generator means produces a signal, said receiver being insensitive to said signals when disconnected from said pickup means and removed from said compartment until said receiver is held in close proximity to the generator means generating the signals.

11. In a vehicle having an operator's station and pneumatic tires, a tire alarm system comprising:
electrical energy source means;
pressure responsive electrical switches coupled to said source means and to the tire inflation stems of said tires;
signal generators coupled to said switches for energization by said source means to generate signals in response to tire pressure level below a predetermined value;

primary inductors coupled to said signal generators;

secondary inductor means disposed to pick up energy from the primary inductors coupled to said signal generators, when said generators are energized;

a signal receiver coupled to said secondary inductor means and including an alarm, for activation of said alarm at a location remote from said tires upon energization of any of said generators;

said signal receiver being portable and movable into the immediate vicinity of one tire after another to magnetically couple said receiver to the primary inductors of one after another of the said signal generators and activate said alarm when said receiver is magnetically coupled to the inductor of the signal generator which is energized, said switches being identical, and one of said switches including a housing having a portion secured to one of said inflation stems, and said one switch having a body movably mounted in the said housing with a portion of said body extending from the housing and a portion of said body in electrical contact with the secured housing portion to make an electrical circuit with said source means and one of said signal generators through said housing and said body to energize said one signal generator, and said one switch including a diaphragm sealing the said housing thereof to the said body thereof whereby tire pressure communicated from said stem to said housing is operable on said body to move said body in said housing to break electrical contact between said body and said housing and thereby de-energize the signal generator coupled thereto.

References Cited by the Examiner
UNITED STATES PATENTS

| | | | |
|---|---|---|---|
| 2,727,221 | 12/55 | Sprigg | 340—58 |
| 2,860,321 | 11/58 | Strickland et al. | 340—58 |
| 3,016,515 | 1/62 | Summers et al. | 340—58 |

NEIL C. READ, *Primary Examiner.*

THOMAS B. HABECKER, *Examiner.*

UNITED STATES PATENT OFFICE
CERTIFICATE OF CORRECTION

Patent No. 3,215,978                        November 2, 1965

Harold M. Brown et al.

It is hereby certified that error appears in the above numbered patent requiring correction and that the said Letters Patent should read as corrected below.

In the grant, line 3, for "Fort Worth, Texas" read -- Fort Wayne, Indiana --; in the heading to the printed specification, line 5, for "Fort Worth, Tex." read -- Fort Wayne, Ind. --; column 4, lines 49 and 50, for "opertaor" read -- operator --; column 8, line 12, for "communication" read -- communicated --; column 10, line 7, for "conpled" read -- coupled --; line 47, for "vehiule" read -- vehicle --.

Signed and sealed this 16th day of August 1966.

(SEAL)
Attest:

ERNEST W. SWIDER                          EDWARD J. BRENNER
Attesting Officer                            Commissioner of Patents